(No Model.) 3 Sheets—Sheet 1.
S. D. MADDIN.
HARVESTER.
No. 303,872. Patented Aug. 19, 1884.
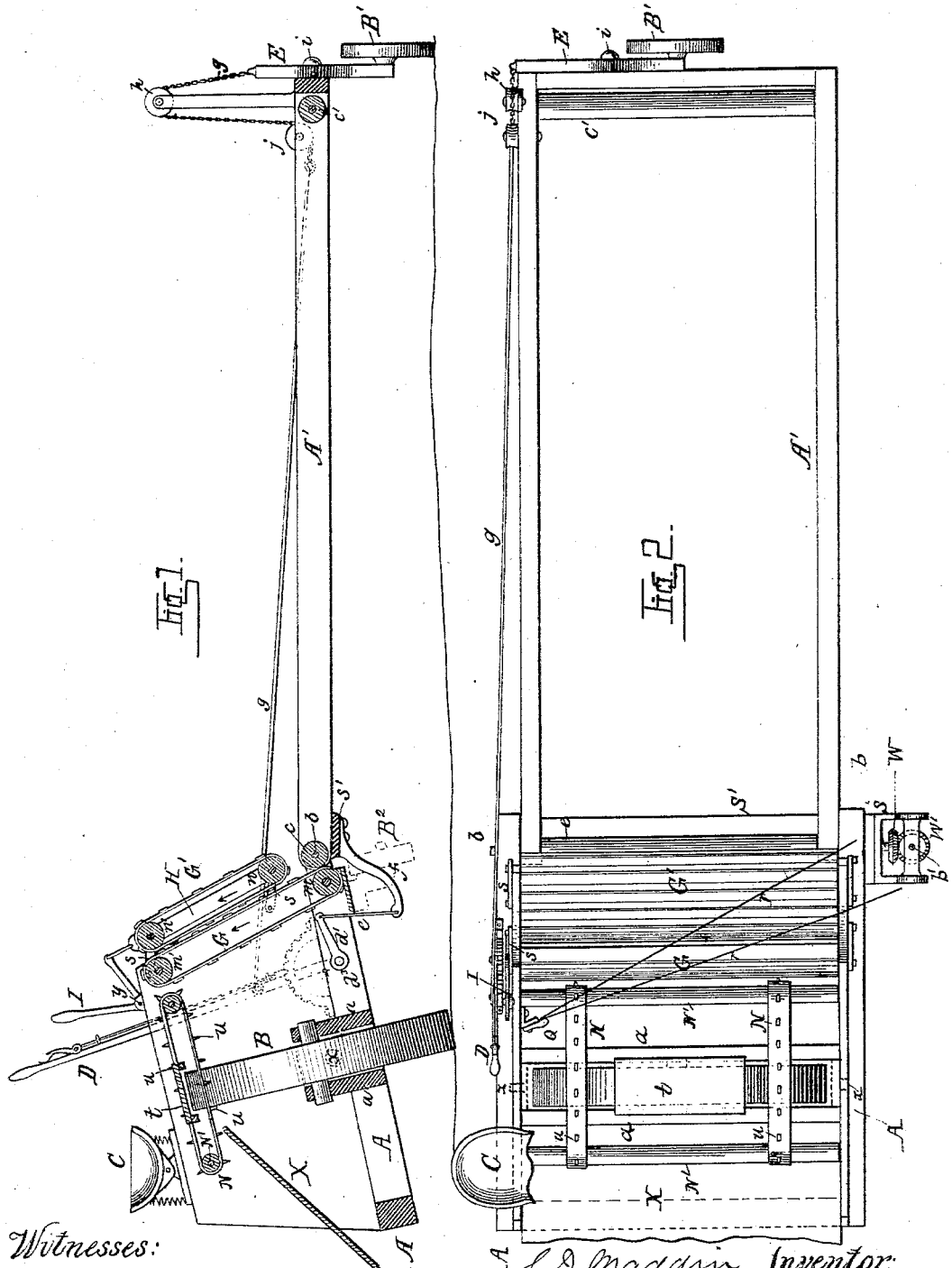
Witnesses:
John G. Hinkel
H. E. Hansmann
S. D. Maddin, Inventor
By Foster & Freeman
Attys.

(No Model.) S. D. MADDIN. 3 Sheets—Sheet 2.
HARVESTER.
No. 303,872. Patented Aug. 19, 1884.
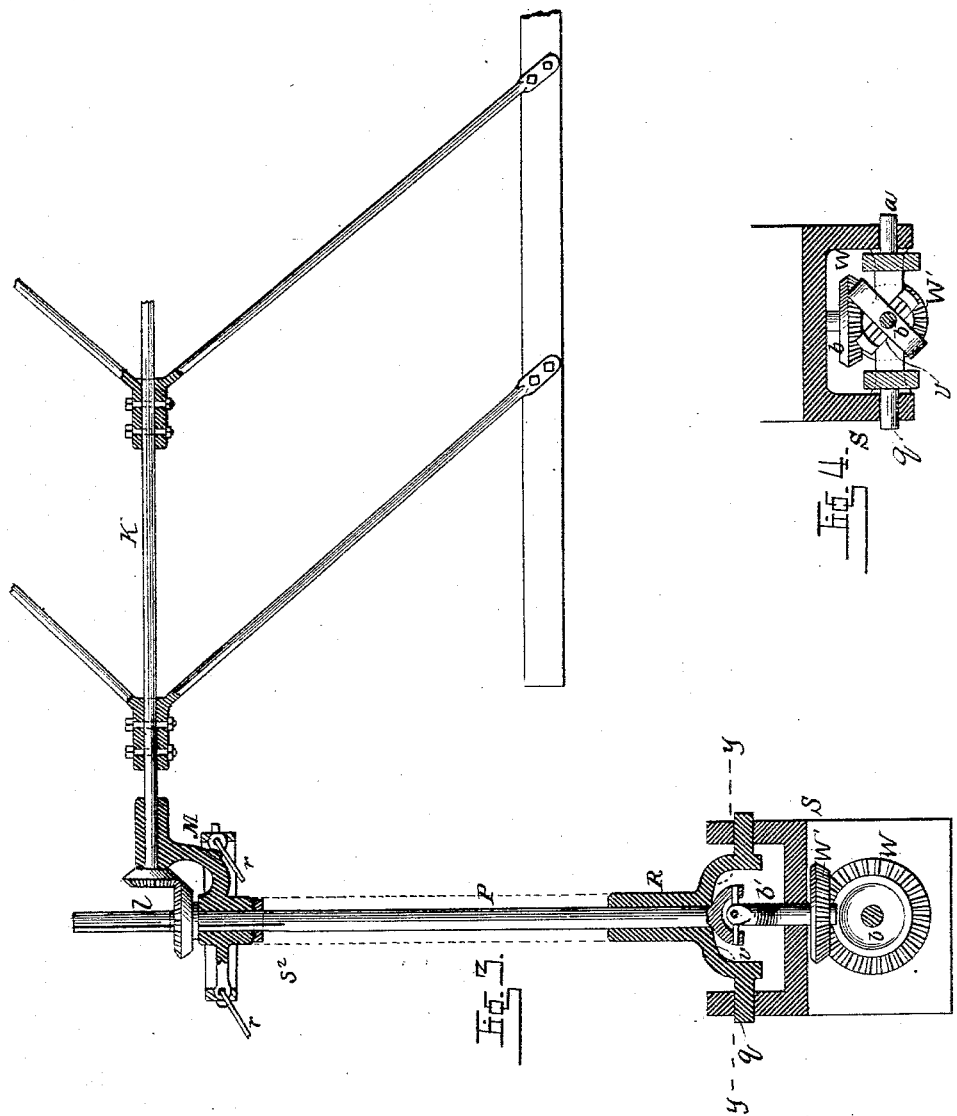

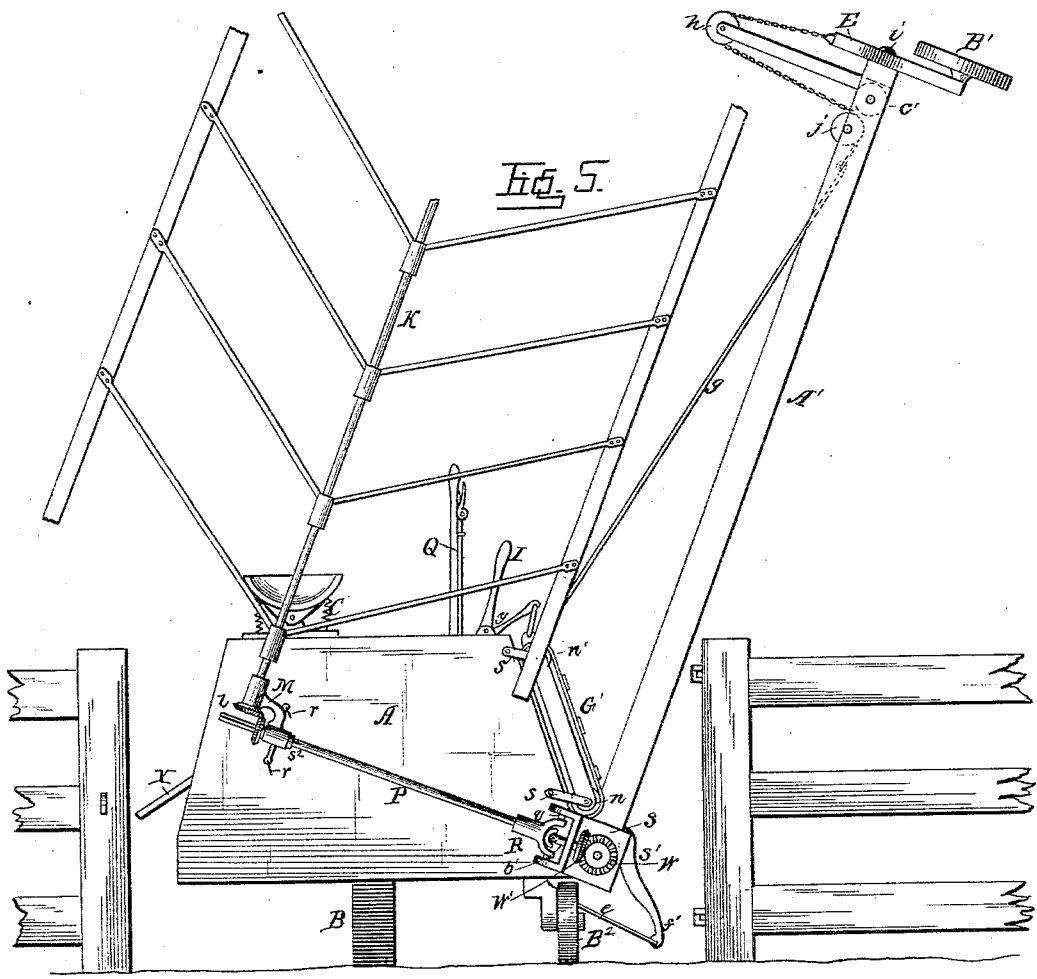

UNITED STATES PATENT OFFICE.

SAMUEL D. MADDIN, OF MIAMISBURG, OHIO, ASSIGNOR TO MARY MADDIN, OF SAME PLACE.

HARVESTER.

SPECIFICATION forming part of Letters Patent No. 303,872, dated August 19, 1884.

Application filed March 1, 1884. (No model.)

*To all whom it may concern:*

Be it known that I, SAMUEL D. MADDIN, a citizen of the United States, residing at Miamisburg, in the county of Montgomery and State of Ohio, have invented certain new and useful Improvements in Harvesters, of which the following is a specification.

My invention relates to certain improvements in harvesters, to facilitate the adjustment of the cutter-frame and reel, and generally facilitate the operations of the machine; and it consists in constructing and arranging the parts of the harvester as fully described hereinafter, and as shown in the drawings, in which—

Figure 1 is a sectional front elevation of sufficient of a harvester to illustrate my improvements. Fig. 2 is a plan of the same. Fig. 3 is a front elevation, partly in section, of the reel and its operating mechanism. Fig. 4 is a horizontal section on the line $y\,y$, Fig. 3. Fig. 5 is a front elevation of the machine with the cutter-frame elevated.

The frame of the machine consists of the main frame A and the cutter-frame A', the main frame being supported by the drive-wheel B, the axle of which turns in bearings in cross-beams $a\,a$ of the main frame. The frame A' is pivoted to the inner end of the frame A, preferably by a shaft, $b$, of the belt-roller $c$, a similar belt-roller, $c'$, at the opposite end of the frame A', serving, with the roller $c$, to support and move the usual carrier-belt. I raise the inner end of the frame A' by tilting the frame A, so as to carry downward the outer end, and I simultaneously lift the outer end of the frame A' by adjusting the lever between the same and the outer grain-wheel, B'. By this means the cutter-frame A' may be elevated to any desired extent; but the binder must be lowered without disturbing the relative position of the parts of the driving mechanism and without disturbing the horizontal position of the cutter-frame.

The platform X of the binder is shown in Fig. 1; but I have not illustrated the binding mechanism, which may be of any suitable character.

The driver's seat is arranged in any suitable position; but I put it outside of the wheel B, that the driver's weight may be utilized to tilt the frame, and a lever, D, is pivoted so as to be easily reached from said seat, and is secured to a shaft, $d^3$, carrying an arm, $d'$, connected by a rod, $e$, with the end of a bracket, $f$, extending diagonally downward from the inner end of the frame A', so that by drawing the upper end of the lever D toward the driver's seat the adjacent ends of both the frames A A' may be elevated, a bolt upon the lever entering a notch in the usual locking-segment and holding the parts in the position to which they are adjusted.

The outer bearing or grain-wheel, B', is carried at one end of a lever, E, pivoted by a bolt, $i$, to the end of the frame A', and a chain or cable, $g$, connected to the rear end of the lever E, passes over a guide-pulley, $h$, and under a guide-pulley, $j$, and is connected to the lever D in such manner that when the latter is drawn to the driver's seat the rear end of the lever E will be lifted and the outer end of the frame A' elevated in proportion as its inner end is raised, the horizontal position of the frame A' being thus maintained.

I have described the driving-wheel B as turning in bearings in the beams $a\,a$, which are tilted with the other portions of the frame A, thus carrying the wheel to an inclined position. I have found that the alteration in the inclination of the driving-wheel does not in any manner affect its operation either as a driver or guide-wheel or support, nor reduce the traction. If desired, however, to preserve the vertical position of the wheel, the beams $a\,a$ may be the side beams of a frame pivoted inside the frame A to turn on trunnions $x$.

The elevator-belts G G' and their operating and adjusting devices shown in the drawings are not herein claimed, and need not be fully described.

To avoid the necessity of lifting the grain to any considerable extent above the wheel B, I extend a shield, $t$, above the latter, and carry the grain from the elevator-belts to the platform X across the shield by means of carrier-belts N, said belt being provided with teeth $u$, and passing around rollers N', as shown, the upper portions of the belts being about on a level with the face of the shield $t$, so that the grain passes from the elevator-belts upon a plane almost level with the top of the wheel B.

The reel is carried by the usual shaft, K, which turns in a bracket, M, supported on or adjacent to an upright driving-shaft, P, which at its lower end turns in a forked bracket, R, having trunnions $q$, turning in ears of a plate, S, bolted to the frame A', so that the bracket R and the shaft P may swing back and forth upon the trunnions $q$. Motion is communicated to the shaft P from a bevel-wheel, W, upon the shaft $b$, which wheel gears with a similar beveled wheel, W', upon a short shaft, $b'$, turning in the bearings on the plate S, the shafts $b'$ and P being connected by a universal joint, $v$, on a line with the axis of the trunnions. Motion is communicated from the shaft P to the reel-shaft K through the medium of the bevel-gears $l$. I thus utilize the shaft $b$ for driving the reel, avoiding the necessity of using a separate driving-shaft, and may set the reel to any desired position without interfering with the connections for driving it. I further make the shaft P a means of supporting the reel.

It will be apparent that the reel must move with the frame A' of the platform. I therefore connect the plate S to a cross bar or plate, S', which is bolted to the frame A', the operation of the parts being in nowise interfered with by the adjustment of the frame, inasmuch as the latter moves about the shaft $b$ as a center, from which motion is imparted to the reel.

The brackets R M may be connected, as shown in dotted lines, or the bracket M may rest on a collar, $s^2$, on the shaft P, and the bracket M is shown as connected by rods $r$ $r$, Figs. 2 and 3, with a lever, Q, accessible from the driver's seat, so that by moving the lever back or forward the reel may be carried toward the front or rear.

As the cutter-bar is arranged in any suitable and usual manner, it is not shown, nor is it necessary to illustrate the connections with the tongue, which are of any of the usual forms, so as to permit the harvester-frame to be tilted forward and back, as desired. The cutter-bar derives its movements from the shaft $b$ or other moving part, so that its position is not affected by the change in position of the frames A A'. The pivoting of the cutter-frame A' to the frame A, so as to permit adjustment of the latter, permits the frame A' to be raised to the inclined position shown in Fig. 5, so that the machine can be driven through a gateway of ordinary width, avoiding the necessity of using the usual harvester-trucks and greatly facilitating the operation in the field, the rods $r$ of course being first detached from the bracket M. To support the main frame A when the frame A' is lifted, I provide said frame A with an auxiliary roller, $B^2$, arranged as shown in Fig. 5.

I claim—

1. The combination, in a harvester, of a tilting main frame supported by the single driving-wheel, a cutter-frame supported at the outer end by a grain-wheel, B', and jointed directly to the inner end of the main frame A, the driver's seat outside the wheel, and a lever and connections, whereby the adjacent ends of both frames may be lifted or depressed, substantially as and for the purpose set forth.

2. The tilting main frame A, and the single driving wheel centrally supporting the same, in combination with the cutter-frame, a reel supported thereby, reel-driving mechanism, and a shaft coinciding with the pivotal connection of the frames for driving said mechanism, substantially as described.

3. The combination of the tilting main frame A, supported by the single driving-wheel, the cutter-frame A', jointed directly to the inner end of the main frame A, the grain-wheel B', supporting the outer end of the frame A', the adjusting-lever and connecting devices between the grain-wheel and the lever, whereby the movement of the latter to raise or lower the inner end of the frame A' is also the means of simultaneously raising and lowering the outer end thereof, substantially as described.

4. The combination of the tilting main frame A, supported by the single wheel, the frame A', jointed thereto, the lever D, a bracket upon the frame A', a connection between the lever D and bracket, the lever E, carrying the grain-wheel B', and connections between the levers D and E, substantially as and for the purpose set forth.

5. A harvester provided with a tilting main frame carried by a single drive-wheel, in combination with a cutter-frame pivoted to the tilting main frame at one side of the driving-wheel, and a binder carried by the tilting main frame at the opposite side of the drive-wheel, for the purpose set forth.

6. The combination of the cutter-frame and tilting main frame pivoted together, the binder-frame carried by the main frame, and the driver's seat arranged upon the binder-frame outside the driving-wheel, substantially as described.

7. The combination of the tilting frame A, supported centrally on the driving-wheel, the frame A', a reel carried by the frame A', and a reel-driving shaft coinciding with the pivotal point of the frames, substantially as set forth.

8. The combination of the pivoted frames, the reel carried by the cutter-frame, the shaft coinciding with the pivot of the frames, and carrying a beveled wheel, W, and shaft P, geared with the wheel W, and with the reel-shaft, substantially as set forth.

In testimony whereof I have signed my name to this specification in the presence of two subscribing witnesses.

SAMUEL D. MADDIN.

Witnesses:
AMOS K. CLAY,
ADAM CLAY.